Patented Nov. 25, 1952

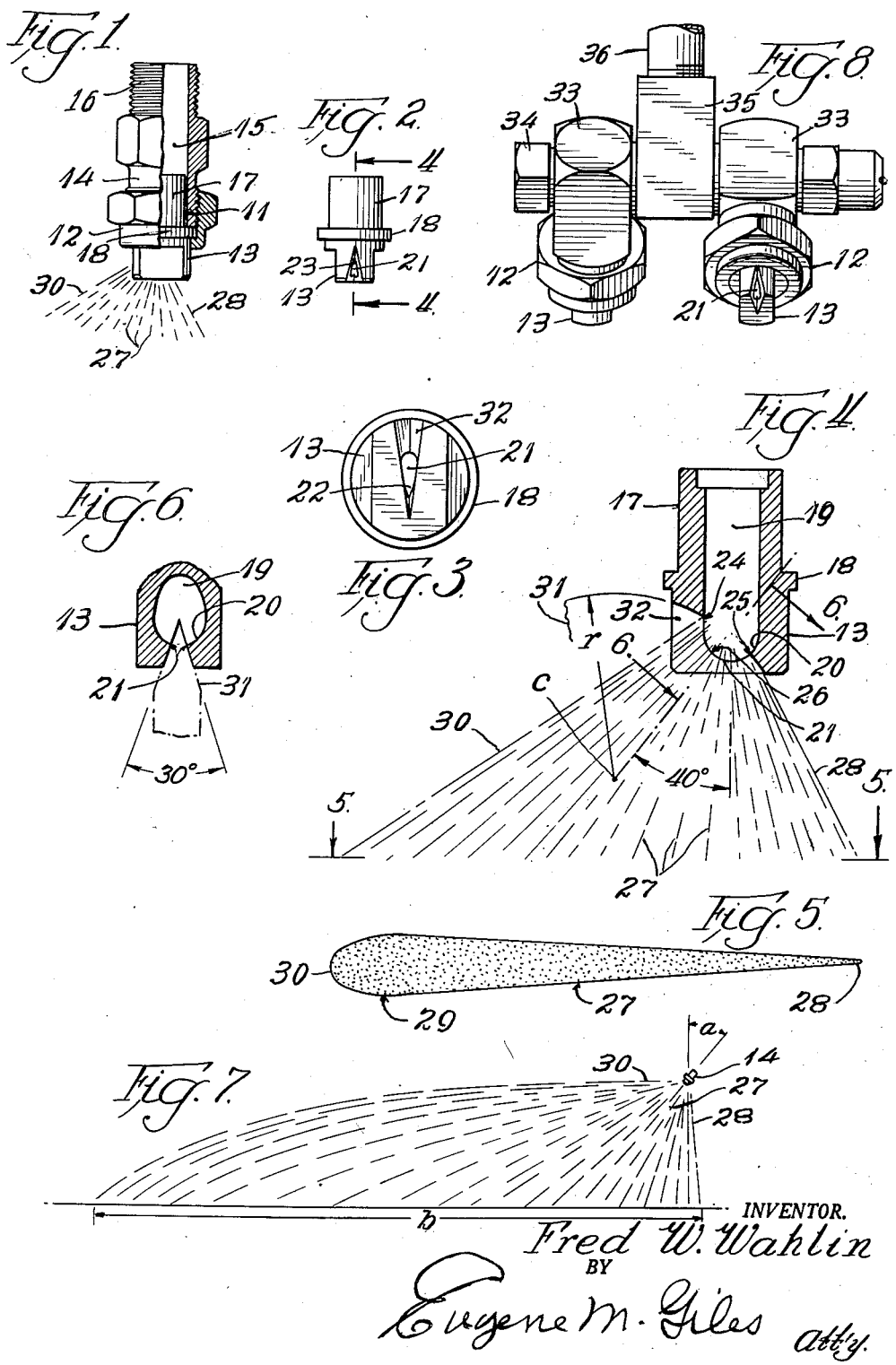

2,619,388

UNITED STATES PATENT OFFICE 2,619,388

OFF-CENTER FLAT SPRAY NOZZLE

Fred W. Wahlin, Oak Park, Ill., assignor to Spraying Systems Co., Bellwood, Ill., a corporation of Illinois Application July 19, 1949, Serial No. 105,576

5 Claims. (Cl. 299—154)

1

My invention relates to spray nozzles for producing a flat fan shaped spray, and has reference more particularly to a nozzle construction and a method of making the nozzle, whereby a flat fan shaped spray stream is produced of progressively greater volume from one edge thereof to the other.

In certain spraying operations, for example, in spraying along a roadway, railway or stream, the spraying equipment is moved along the roadway, railway or stream and the spraying liquid is supplied from the spraying equipment through a nozzle which produces a flat fan shaped spray, the nozzle being arranged so that the spray is directed downwardly at one edge of the fan shaped spray stream and the spray being fanned outwardly to approximately a 90° spread so that at the other edge of the fan shaped spray stream the stray is discharged approximately horizontally sidewise from the spraying equipment to a considerable distance laterally therefrom.

Thus the spray is spread over a long narrow zone which extends laterally from the location of the spraying equipment at substantially right angles to the path of movement thereof along the roadway, railway or stream.

It is desirable in such spraying operations to project the spray laterally as far as possible from the spraying equipment so as to cover a wide area along the roadway, railway or stream, and it is also quite important to distribute the spray uniformly throughout the range of the spray so as to insure uniform coverage of the area to which the spray is applied.

However, as the direction of discharge of the fan shaped spray stream varies from the downward direction at one edge thereof to the outward or approximately horizontal direction at the other edge, each successive fan-wise portion of the spray stream is spread over a successively greater length of the spray zone, so that if the volume of the spray stream is uniform throughout the substantially 90° fan shaped spread thereof and of an amount for proper coverage at the inner end of the elongated spray zone, it is entirely inadequate to cover the outer end portion of the spray zone.

Accordingly, it is important, in order to assure uniform spray coverage throughout the length of the elongated spray zone, that the fan shaped spray stream be of suitable volume at the downwardly directed edge portion thereof to properly cover the inner end portion of the elongated spray zone and that the spray stream increase in volume from that edge portion to the outwardly or substantially horizontally directed edge portion thereof so that the spray stream volume at any given place throughout the approximately 90 degrees of its spread is proportionate to the length of the particular portion of the elongated spray zone to be covered thereby.

Moreover, as the range of the spray at a given pressure, or the distance to which the spray is projected laterally from the spraying equipment at such pressure, increases with the volume of discharge, such progressive increase in volume from the downwardly directed edge portion of the fan shaped spray to the outwardly or substantially horizontally directed edge portion thereof has the additional advantage that it provides such volume of discharge in the lateral spraying direction that maximum spray range and wide coverage along the roadway, railway or stream is assumed.

Such increase in volume from one edge of the fan shaped spray stream to the other edge thereof, to provide long range of spray coverage with uniform spray distribution throughout the length of the spray zone in spraying along roadways, railways and streams and for other similar purposes, may be accomplished by providing the nozzle with an elongated discharge orifice of progressively increasing width from one end thereof to the other in conformity with the required spray stream shape, as disclosed in my application Serial No. 104,672, filed July 14, 1949.

With my present invention, however, no such shaping the discharge orifice in conformity with the spray stream shape is required as I have discovered that appropriate shaping of the spray stream to provide long range and uniform spray distribution may be accomplished by providing the nozzle with an elongated orifice of substanstilly the same shape and made in substantially the same manner as the orifice of an ordinary flat spray nozzle, and merely locating such orifice off center at the end of the nozzle bore through which the liquid is supplied to the nozzle orifice.

The nozzle bore terminates in a dome shaped outer end, as in the nozzle disclosed in my above mentioned application Serial No. 104,672, and the orifice extends across the top of the dome but unequal distances at the opposite sides of the dome center, said orifice extending, for example, down one side of the dome nearly to the base thereof, or even beyond, and extending only a relatively short distance beyond the dome center at the other side.

The principal objects of my invention are to provide an improved nozzle for producing a fan shaped spray stream with appropriate volume varition from one edge thereof to the other for spraying operations of the character above described; to assure long range of spraying sidewise from the nozzle location with uniform spray distribution throughout the spray range; to provide an improved method of making a nozzle for such sidewise spraying; to obtain the spray stream shape required for such long range uniform sidewise spraying without specially shaping the nozzle orifice in conformity with such spray stream shape; to permit the formation of the nozzle orifice in a single simple operation with the same facilities customarily employed in making the orifice in conventional fan spray nozzles; and in general to provide a nozzle for long range uniform sidewise spraying which is of simple construction and convenient and economical to manufacture, these and other objects being accomplished as pointed out more particularly hereinafter and as shown in the accompanying drawing, in which;

Fig. 1 is a side view, partly in section, of a nozzle of conventional form embodying my improvements;

Fig. 2 is a side view of the nozzle tip of the nozzle of Fig. 1, looking at that side of the nozzle tip which is at the left of Fig. 1;

Fig. 3 is an enlarged view of the outer end of the nozzle tip of Fig. 2;

Fig. 4 is an enlarged sectional view of the nozzle tip taken on the line 4—4 of Fig. 2 and showing the spray pattern produced by that nozzle tip;

Fig. 5 is a cross sectional view of the spray pattern of Fig. 4 taken on the line 5—5 thereof;

Fig. 6 is a sectional view, partly broken away, of the nozzle tip taken on the line 6—6 of Fig. 4;

Fig. 7 is a side view showing the full spray pattern produced by the nozzle of Fig. 1 in the normal spraying position thereof; and Fig. 8 is a side view of a form of duplex nozzle to which my present invention is conveniently applicable.

The nozzles shown herein are of the same general construction as the nozzles disclosed in my aforesaid application Serial No. 104,672 in the respect that each comprises a hollow body with an externally threaded outer end 11 engaged by an internally threaded clamping ring 12 by which a nozzle tip 13 is secured to the outer end of the nozzle body.

The nozzle body shown in Fig. 1 hereof at 14 is of a conventional form with an opening 15 extending therethrough and is provided with a male threading 16 at the end remote from the threaded end 11 for attachment of the nozzle to a supply pipe through which the spraying liquid is supplied to the nozzle.

The nozzle tip 13, as illustrated herein, has an extension 17 which projects into the outer end of the nozzle body opening 15 and is provided between its ends with an annular flange 18 which is clamped in leak-proof manner against the outer end of the nozzle body 14 by the clamping ring 12 which is formed at the outer end to overhang the flange 18.

This nozzle tip 13 has a bored out opening 19 terminating at the outer end, like the nozzle tip of my aforesaid application Serial No. 104,672, in a dome shaped end 20 through which a notch is cut to provide the nozzle discharge orifice.

In accordance with the present invention this orifice, which is indicated at 21, is elongated to produce a fan shaped spray, but with correspondingly shaped ends and of greatest width approximately midway between the ends, and preferably of the shape produced by a rotary milling cutter with V-shaped cutting edge.

When thus produced the maximum width of the orifice is approximately midway between the orifice ends, the exact location of greatest width depending on the place of cutting through the dome shaped bore end 20, and the opposite ends of the orifice are of acute angle shape as indicated at 22 and 23 respectively, the angularity thereof depending on the angularity of the cutting edge of the milling cutter and the depth of penetration of the cutter into the dome shaped end of the bore 19.

It is an important feature of the present invention that this orifice 21 is not centered, in the direction of its length, across the outer end of the bore 19, but in that direction is arranged sufficiently off center so that one end thereof, which is indicated at 24 in Fig. 4, extends a substantially greater distance down the side of the dome formation 20 than the other end 25 thereof extends down the other side of the dome 20, and the place of greatest width of the orifice 21 is at one side of the dome 20 at a place appreciably off center with respect to the axis of the bore 19, as indicated at 26 in Fig. 4.

When the orifice 21 is thus arranged, the liquid supplied thereto through the bore 19, discharges in a fan shaped stream of substantially 90° spread, as shown at 27 in Figs. 1, 4 and 7, and this fan shaped stream at the edge 28 thereof which issues through the orifice end 22 (see Fig. 3) is quite thin, as indicated in Fig. 5, and the stream progressively increases in thickness to the place 29 near the other edge 30 which issues through the orifice end 23 (see Fig. 2).

When this spray nozzle is employed for spraying along a roadway, railway or stream or for similar spraying operations, it is arranged, as indicated in Fig. 7, at a suitable angle $a$ and with the nozzle orifice 21 upright and the end 23 thereof uppermost so that the spray edge 31 is discharged downwardly and the spray edge 30 is discharged outwardly in a direction approximately horizontal, as shown in Fig. 7, and by reason of the large volume of discharge at and near the edge 30 the nozzle has an unusually wide range of spray as indicated at $b$ in Fig. 7.

Moreover, by reason of the progressive increase in volume of the spray stream from the upright edge 28 to the outwardly directed edge 30 the volume of spray throughout the spray stream 27 is proportionate to the extent of the spray range $b$ to which the spray is applicable and uniformity of distribution of the spray throughout the range $b$ is assured.

For making the nozzle tip 13 with the orifice 21 off center as explained above, I prefer to first provide the tip with the bore 19 having the dome shaped outer end 20 terminating a short distance from the outer end of the tip 13 substantially as shown in Fig. 4. This may be accomplished with a drill having the cutting end thereof ground to the dome shape 20 required at the outer end of the bore 19.

Then the orifice 21 is formed by a rotary V-edged milling cutter 31 which is applied in a suitable off center position to the outer end of the tip 13 to cut a groove therethrough in a manner to locate the orifice off center in the manner explained above and shown particularly in Fig. 4.

With the nozzle tip illustrated herein, a rotary milling cutter having a 30° V-shaped cutting edge as indicated in Fig. 6, is disposed off center with respect to the nozzle tip substantially as indicated in Fig. 4, with the cutter center c in a line corresponding to the section line 6—6, which extends through or approximately through the center of curvature of the dome 20 and at approximately a 40° angle to the axis of the bore 19, and then by relative movement of the milling cutter and nozzle tip toward one another in a direction along the section line 6—6 the notch or groove 32 is cut off center in the outer end of the nozzle tip 13 to produce the orifice 21, it being understand that the relative movement of the rotary cutter and nozzle tip toward one another is only continued to the extent to cut the notch or groove 32 to the depth shown in Fig. 4.

Obviously the bore 19 with dome shaped end 20 might be drilled after notch or groove 32 is formed in the outer end of the nozzle tip and variation in the spray pattern may be obtained by varying the curvature of the dome 20, the angularity of the cutting edge of the rotary cutter and the particular off center arrangement of the orifice 21 relative to the axis of the bore 19. This off center relation may be varied appreciably as I have found that an off center arrangement of 20° or 25° instead of the 40° of Fig. 4 provides a satisfactory spray.

Fig. 4 however shows a relative size and shape of bore 19, dome 20 and orifice 21 and off center arrangement of orifice which I have found particularly advantageous and, with a notch or groove 32 of 30° angularity, cut on a radius such as indicated at r in Fig. 4, a particularly satisfactory spray is produced for the spray purposes mentioned herein.

The nozzle orifice described above may be used advantageously in nozzles of various other types. For example it may be employed in a duplex or twin nozzle structure such as shown in Fig. 8 and particularly described in my aforesaid application Serial No. 104,672.

In said duplex nozzle of Fig. 8 two nozzle bodies 33 are secured by a bolt 34 to opposite sides of a center fitting 35 through which spraying liquid is supplied from a pipe 36 to the interior of the nozzle bodies 33.

Each nozzle body 33 has a nozzle tip 13 attached thereto by a clamping ring 12 in the same manner as the nozzle tip is attached to the nozzle body of Fig. 1 and each nozzle tip 13 of Fig. 8 has a discharge orifice 21 like that shown in Fig. 4.

The nozzle bodies 33 are adjustable angularly on the center fitting 35 and are arranged to discharge the streams therefrom in opposite directions, each in the manner shown in Fig. 7 so that the streams meet or overlap at their edges 23 and provide uniform spray distribution throughout a zone of double the range of a single nozzle.

While I have shown and described my invention in a preferred form, I am aware that various changes and modifications may be made therein without departing from the principles of my invention, the scope of which is to be determined by the appended claims.

What is claimed is:

1. A spray nozzle having therein an elongated passageway with a dome shaped end, said nozzle having an elongated orifice which extends crosswise of said end substantially in an axial plane of the passageway and opens eccentrically therefrom to the exterior of the nozzle, said orifice having both ends thereof of V-shape and located respectively near the top portion of said dome shaped end and near the base of the dome shaped end and at opposite sides of the central axis of said dome shaped end, and said orifice being of greatest width substantially midway between said ends thereof at a place where the orifice faces outwardly from the axis of the elongated passageway.

2. A spray nozzle having therein an elongated passageway with a dome shaped outer end, said nozzle having an elongated orifice which extends crosswise of said end substantially in an axial plane of said passageway and opens eccentrically therefrom to the exterior of the nozzle, said orifice having one end thereof at the top of the dome shaped end and the other end thereof near the base of said dome shaped end, and said orifice being of greatest width substantially midway between said ends at a place where it faces outwardly from the axis of said passageway.

3. A spray nozzle having therein an elongated passageway with dome shaped outer end, said nozzle having a wall portion in which said dome shaped end is located and said wall portion having an external arcuate groove in a plane through the axis of the passageway and of substantially V-shape cross section and communicating at the bottom thereof with the interior of said dome shaped end through an elongated opening each end of which is V-shaped, one of said V-shaped ends being at the top of the dome and the other of said V-shaped ends being approximately at the base of the dome, and said opening being of greatest width substantially midway between the V-shaped ends thereof.

4. A spray nozzle having therein an elongated passageway with dome shaped outer end, said nozzle having a wall portion in which said dome shaped end is located and said wall portion having an external arcuate groove in a plane through the axis of the passageway and of substantially V-shape cross section and communicating at the bottom thereof with the interior of said dome shaped end through an elongated opening each end of which is V-shaped, one of said V-shaped ends being at the top of the dome and the other of said V-shaped ends being approximately at the base of the dome, and said opening being of greatest width substantially midway between the V-shaped ends thereof, said groove being of a shape corresponding to that of a section of the V-shaped edge of a circular disk.

5. A twin nozzle assembly comprising a fitting having a pair of nozzles mounted thereon and angularly disposed to one another, each nozzle being pivoted to said fitting and individually adjustable about its pivotal axis in a plane perpendicular to the pivotal axis of the other nozzle to vary the angular adjustment of each nozzle relative to the other nozzle, each nozzle having therein a passage which leads toward the outer end of the nozzle and has a dome shaped outer end and each nozzle having an elongated orifice which opens outwardly from its said dome shaped end at the opposite side thereof from the other nozzle and extends crosswise of said dome shaped end in an axial plane of said passage which is perpendicular to the pivotal axis of the other nozzle, each said orifice having the opposite ends thereof V-shaped with one of said ends at the top of the dome and the other of said ends at the side of the dome near the base thereof and each said orifice being of greatest width midway between its ends and tapered therefrom to each V-shaped end thereof.

FRED W. WAHLIN.

REFERENCES CITED

The following references are of record in the file of this patent:

UNITED STATES PATENTS

| Number | Name | Date |
|---|---|---|
| 287,670 | Harman | Oct. 30, 1883 |
| 334,110 | Delaney | Jan. 12, 1886 |
| 736,134 | Murphy | Aug. 11, 1903 |
| 871,029 | Buelna et al. | Nov. 12, 1907 |
| 1,151,258 | Fischer | Aug. 24, 1915 |
| 1,617,673 | Dezurik | Feb. 15, 1927 |

FOREIGN PATENTS

| Number | Country | Date |
|---|---|---|
| 226,600 | Great Britain | Dec. 22, 1924 |